Dec. 28, 1948.     E. H. GOLDSMITH ET AL     2,457,543
OPTICAL SIGHTING DEVICE HAVING REFLECTOR
MEANS FOR TRACKING MOVABLE OBJECTS

Filed March 16, 1946                          6 Sheets-Sheet 1

INVENTORS: E. H. GOLDSMITH
J. W. SCHAEFER
R. V. TERRY

BY J. MacDonald
ATTORNEY

INVENTORS:
E. H. GOLDSMITH
J. W. SCHAEFER
R. V. TERRY

BY J. MacDonald
ATTORNEY

Dec. 28, 1948.  E. H. GOLDSMITH ET AL  2,457,543
OPTICAL SIGHTING DEVICE HAVING REFLECTOR
MEANS FOR TRACKING MOVABLE OBJECTS
Filed March 16, 1946  6 Sheets-Sheet 3

INVENTORS:
E. H. GOLDSMITH
J. W. SCHAEFER
R. V. TERRY
BY J. MacDonald
ATTORNEY

Dec. 28, 1948.    E. H. GOLDSMITH ET AL    2,457,543
OPTICAL SIGHTING DEVICE HAVING REFLECTOR
MEANS FOR TRACKING MOVABLE OBJECTS
Filed March 16, 1946    6 Sheets-Sheet 4

INVENTORS:
E. H. GOLDSMITH
J. W. SCHAEFER
R. V. TERRY

BY J. MacDonald
ATTORNEY

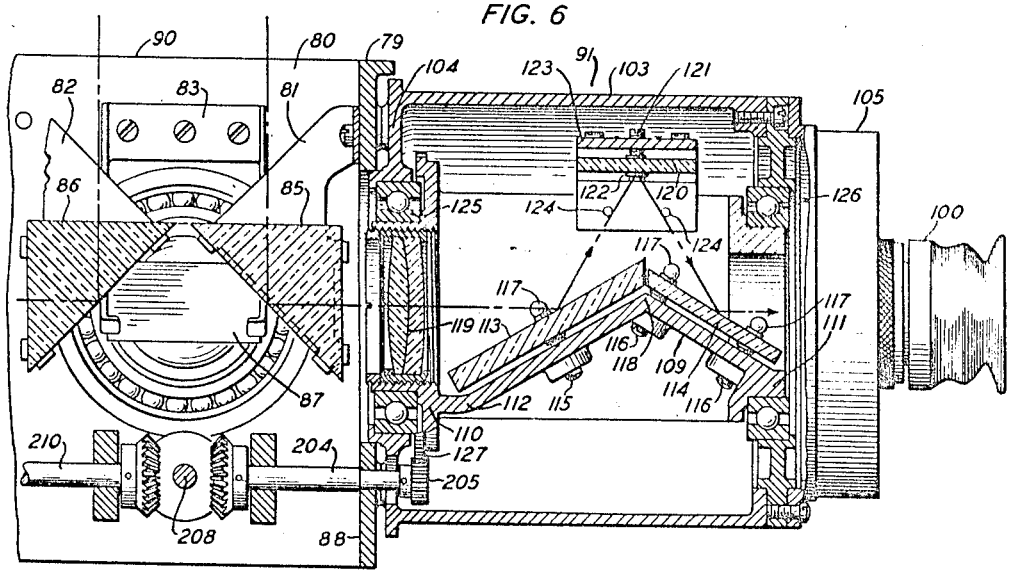

Dec. 28, 1948.    E. H. GOLDSMITH ET AL    2,457,543
OPTICAL SIGHTING DEVICE HAVING REFLECTOR
MEANS FOR TRACKING MOVABLE OBJECTS
Filed March 16, 1946    6 Sheets-Sheet 6

INVENTORS:
E. H. GOLDSMITH
J. W. SCHAEFER
R. V. TERRY
BY J. MacDonald
ATTORNEY

Patented Dec. 28, 1948

2,457,543

UNITED STATES PATENT OFFICE 2,457,543

OPTICAL SIGHTING DEVICE HAVING REFLECTOR MEANS FOR TRACKING MOVABLE OBJECTS

Elsworth H. Goldsmith, New York, N. Y., Roy V. Terry, Maplewood, N. J., and Jacob W. Schaefer, Philadelphia, Pa., assignors to Bell Telephone Laboratories, Incorporated, New York, N. Y., a corporation of New York Application March 16, 1946, Serial No. 654,980

4 Claims. (Cl. 88—72)

This invention relates to optical sighting apparatus and more particularly to optical sighting apparatus usable as a means to detect and observe a moving target and keep track of the movements of the target.

The invention is applicable for use in combination with gun director apparatus and provides a means for detecting and observing a target and giving indications of the position and movements of the target.

In certain gun director apparatus devised and developed for training a gun to direct a projectile to a moving target the optical apparatus for detecting and observing the target is commonly called a tracker. The tracker in some cases is located remote from the gun and other parts of the gun director apparatus and it has been found necessary or advantageous in some cases to move the tracker to various locations.

In trackers of a type at present in use the major portion of the tracker is rotatably mounted on a support and is equipped with seats on which operators of the tracker sit while operating the tracker to detect and follow a target. When the major portion of the tracker is rotated in azimuth to detect a target the operators are carried around on the rotatable portion of the tracker and must make some of their observations while in motion. The tracker is quite large and heavy and not readily transportable unless mounted on a suitable vehicle.

An object of the invention is to provide a relatively light weight and readily transportable optical sighting apparatus and in the operation of which the operators are not required to move around while making the required observations.

A feature of the invention resides in a head member of the optical sighting apparatus.

Another feature resides in light ray receiving and reflecting means provided in the optical sighting apparatus.

Another feature resides in an optical eye-piece device provided in the optical sighting apparatus.

In the drawings:

Fig. 6 is an enlarged side view, partly in section, of optical apparatus supported in the body and taken on the line 6—6 in Fig. 4;

Figure 7:
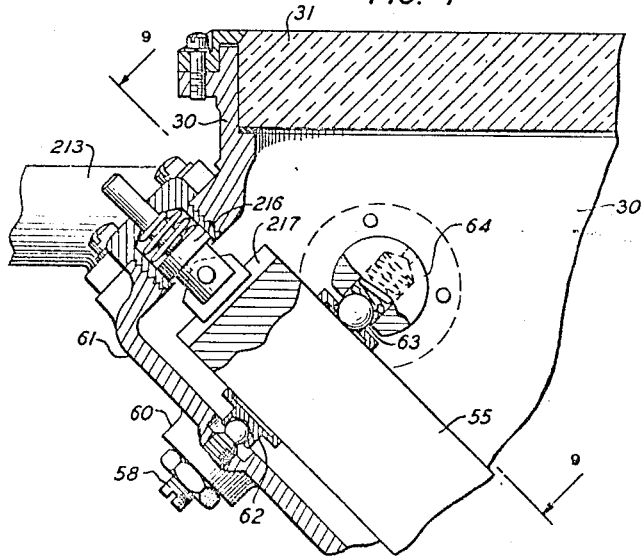
Figs. 7 and 8 are enlarged views in section, of portions of the optical sighting apparatus.
Figure 9:
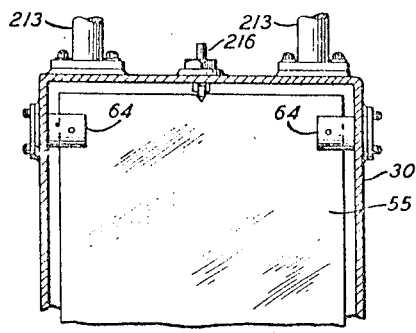

Fig. 9 is an enlarged view, partly in section, of a portion of the optical sighting apparatus taken on line 9—9 in Fig. 7; and Fig. 10 is a schematic illustration of some of the target detecting and observing means provided in the optical sighting apparatus and shows means for operating the target detecting and observing means and Selsyn devices used in transmitting operations of the optical sighting apparatus to certain other parts, not shown, of gun director apparatus.

In tracker apparatus employed in detecting and observing an airplane in flight or some other moving target, means are provided to scan an area to search out a target. The scanning means must be movable in azimuth and elevation so that it may be trained on the target. The usual practice is to turn the major portion of the tracker in azimuth and tilt certain parts of the tracker to bring the target detecting and observing means in line with the target.

In the present invention it is only necessary to move a head member in azimuth and to tilt an image receiving means contained in the head member to train the tracker on a target.

Figure 1:
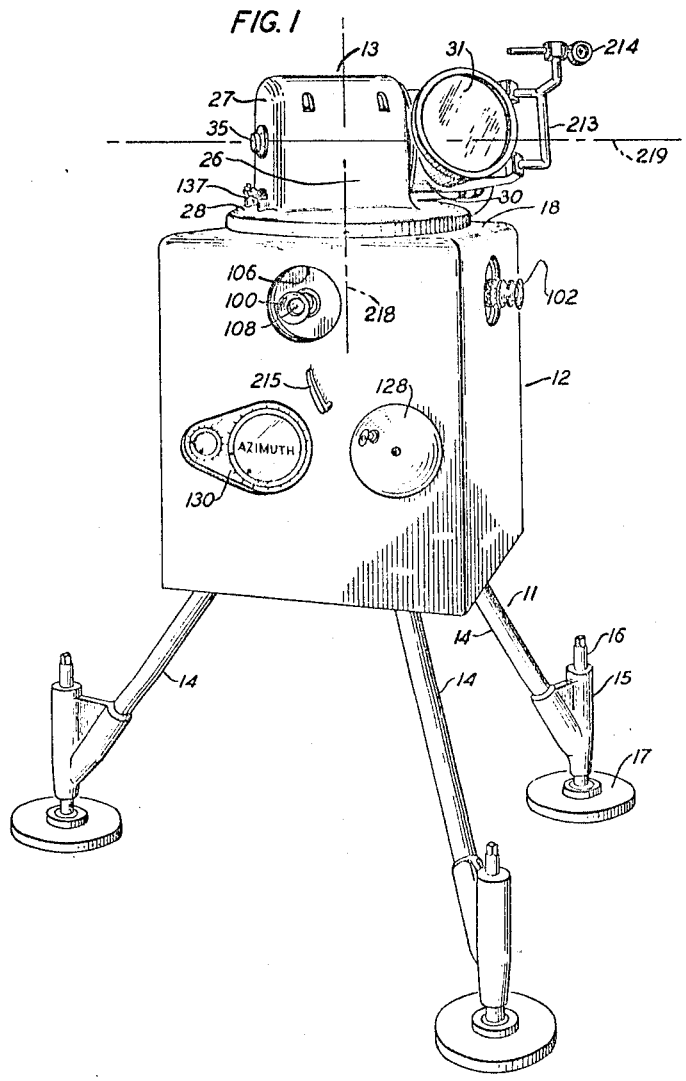
Fig. 1 is a view in perspective of the optical sighting apparatus embodying the invention.

The tracker embodying the present invention as shown in Fig. 1 comprises a support 11, a body 12 supported thereon and a head member 13 supported on the body 12.

The support 11 comprises a plurality of leg members 14 attached at their upper ends to a frame, not shown, but which is detachably connected to the body 12 to form a support for the body 12. The lower end of each leg member 14 extends into a Y fitting 15 equipped with a threaded rod 16 which extends downwardly through the Y fitting 15 and into a foot 17. The threaded portion of the rod 16 is in engagement with a correspondingly threaded portion in the Y fitting 15 and the threaded rod 16 may be turned to raise or lower the Y fitting 15 relative to the foot 17. By suitable adjustment of the threaded rods 16 the support 11 may be adjusted to bring the body 12 to a required elevated or lowered position for convenient use by the operators of the tracker and to make the body stand level when the ground on which the tracker stands presents an uneven surface.

Figure 2:
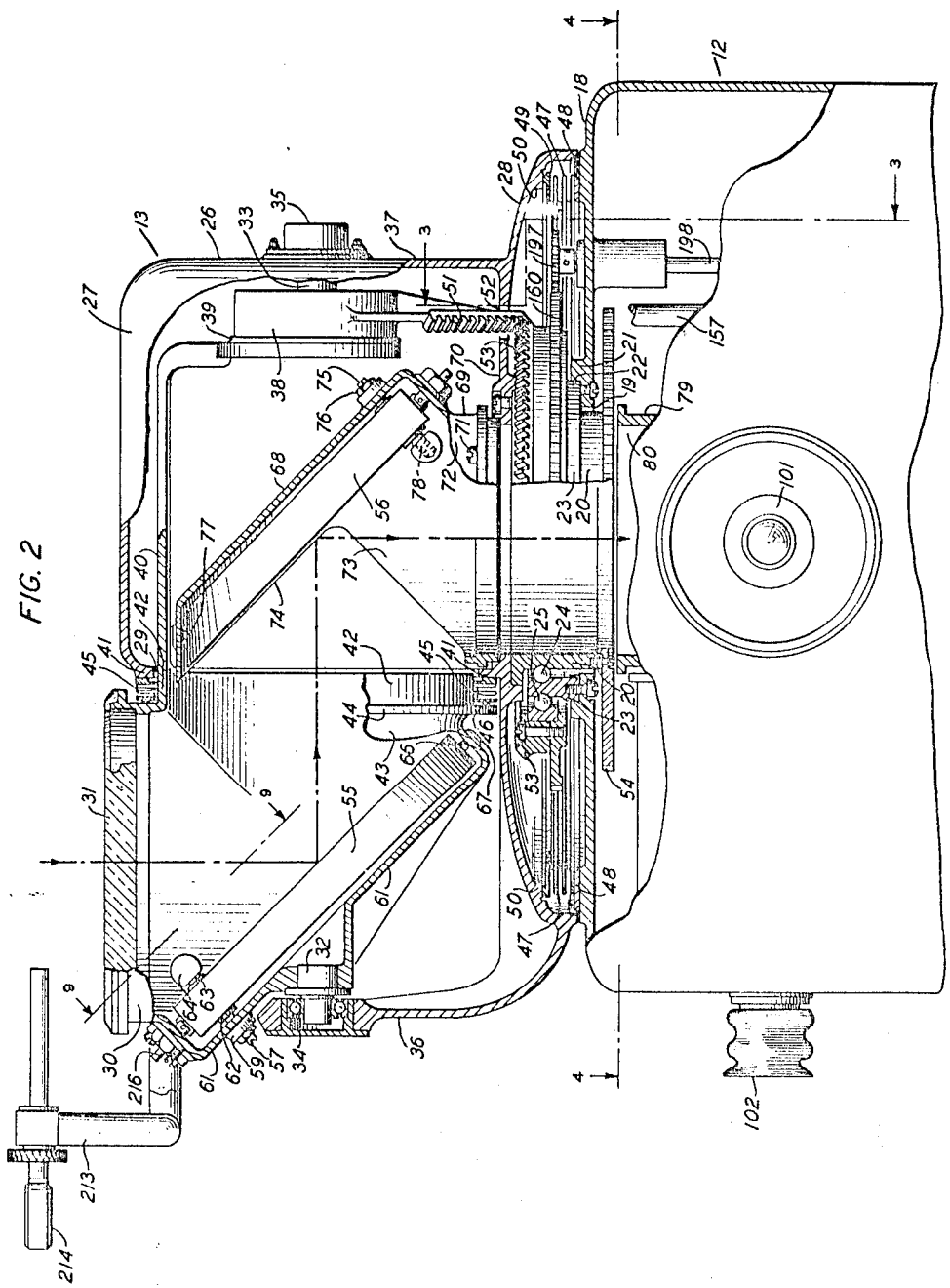
Fig. 2 is an enlarged view, partly in section, of the head member and an upper portion of the supporting means for the head member.
Figure 3:
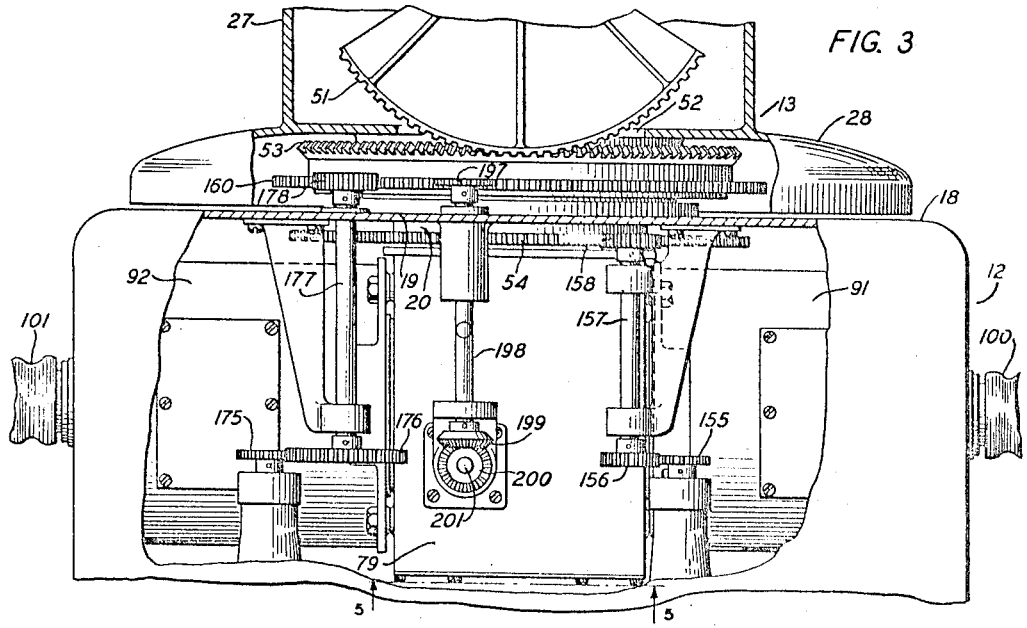
Fig. 3 is an enlarged view, partly in section, of certain parts shown in Fig. 2 and taken on the line 3—3 in Fig. 2.
Figure 5:
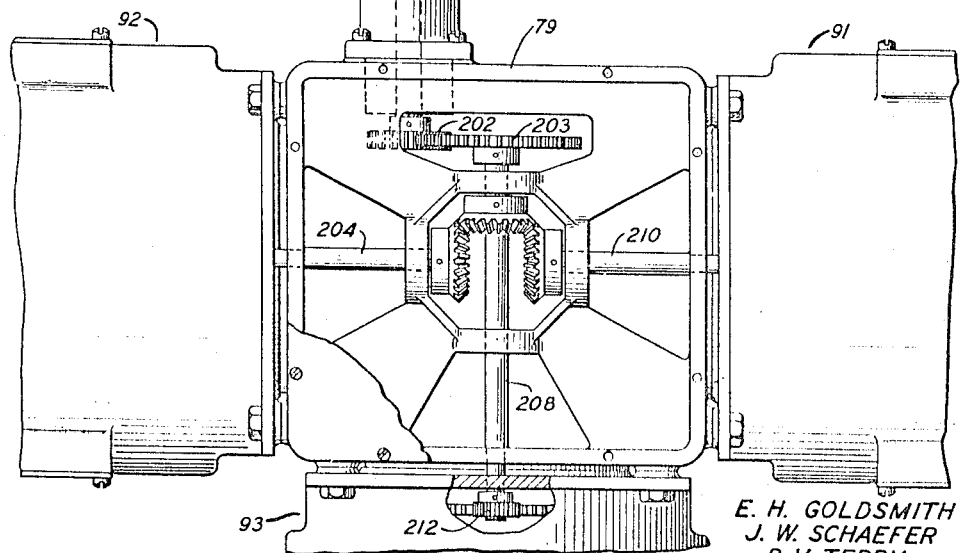
Fig. 5 is an enlarged bottom plan view of a portion of the optical sighting apparatus taken on the line 5—5 in Fig. 3.

The body 12 is a casing in which certain parts of the tracker apparatus are housed and supported. As shown in Figs. 2 and 3 a top wall 18 of the body 12 is apertured at 19 to accommodate a flanged tube 20 supported in and extending downwardly from the head member 13 and into the body 12. The flanged tube 20 provides a passageway for light beams received in the head member 13 and directed from the head member 13 into the body 12. Surrounding the aperture 19 is a boss 21 with a recess 22 formed therein to provide a rest for a bearing support 23 in which inner and outer annular grooves are provided to support sets of ball bearings 24 and 25.

The head member 13 comprises a casing-type body 26 having a horizontal hood portion 27 extending upwardly from a dome portion 28, the lower end of the dome portion 28 being slightly elevated from the top wall 18 of the body 12 when the head member 13 is mounted in place. The hood portion 27 extends only part way across the dome portion 28 and is open at one end 29 to accommodate a substantially L-shaped casing 30 in one end of which is supported a cover glass 31 which serves as a light receiving means for the head member 13. Trunnions 32 and 33 are provided on end portions of the casing 30 to engage in bearings 34 and 35 respectively, to support the casing 30 and permit the casing 30 to be rotated on a horizontal axis, the bearing 34 being mounted in a bracket 36 extending upwardly from the dome portion 28, the bearing 35 being mounted in an end wall 37 of the hood portion 27 and the trunnion 33 being a projection on a flange 38 which is secured to an enlarged end portion 39 of an arm 40 extending from the casing 30 and longitudinally of and within the hood portion 27. The open end 29 of the hood portion 27 is formed to provide an annular flange 41 to receive one end 42 of the body portion 43 of the casing 30 which is operable to rotate in the open end 29 of the hood portion 27. Surrounding the end portion 42 of the casing 30 and disposed between the flange 41 on the hood portion 27 and a flange 44 on the casing 30 is a Sylphon-type bellows 45, one end of the bellows 45 being secured to the flange 41 and the other end being equipped with a bearing ring 46 which is in frictional engagement with the flange 44. The bellows 45 is slightly compressed to develop spring pressure therein and serves to prevent light rays and dust particles from entering the casing 30 and the hood portion 27 at the point where the casing 30 extends into the hood portion 27. A Sylphon-type bellows 47 is disposed within the space defined by the dome portion 28 of the head member 13 and the top 18 of the body 12 to stop light rays and dust particles coming through the space between the lower end of the dome portion 28 and the top 18 of the body 12. One end of the bellows 47 is secured to a ring 48 on the top 18 of the body 12 and the other end of the bellows 47 is equipped with a bearing ring 49 which is in frictional engagement with an annular boss 50 projecting from the undersurface of the dome portion 28.

Secured to and projecting from the flange 38 is a sector gear 51 which extends through an aperture 52 in the dome portion 28 and into engagement with a bevel gear 53 located within the dome portion 28. The casing 30 may be rotated on a horizontal axis by suitable operation of the bevel gear 53. When the bevel gear 53 is suitably rotated the casing 30 is rotated on a horizontal axis.

The head 13 is rotatable as a whole on a vertical axis through operation of a gear 54 which is secured to the lower end of the flanged tube 20 and located within the body 12. The head 13 is rotated on a vertical axis to move the cover glass 31 in azimuth and the casing 30 is rotated on a horizontal axis to tilt the cover glass 31 for elevation. It is obvious therefore that the cover glass 31 may be moved as required to train the cover glass 31 on an airplane in flight or on some other moving target.

Figure 8:
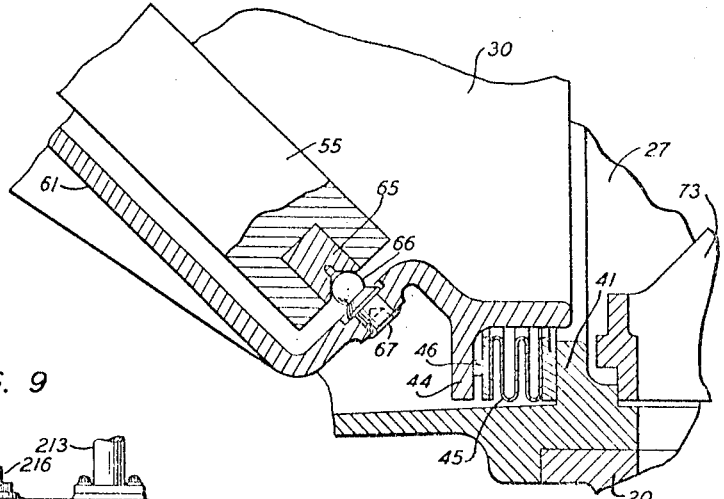

A mirror 55 is housed in the casing 30 to receive light rays reflected from the target on which the cover glass 31 is trained and to direct the light rays to a mirror 56. The mirror 55 is disposed angularly relative to the cover glass 31 and is supported at three spaced points, two of the points being engaged by spaced screws 57 and 58 which are adjustably mounted in screw supports 59 and 60 respectively supported on an inclined wall 61 on one end of the casing 30. The screws 57 and 58 project through apertures provided in the inclined wall 61 and each screw 57 and 58 as shown in Fig. 7 is provided with a ball and socket-type member 62 bearing against the rear surface of the mirror 55. In register with each screw 57 and 58 and bearing against the front face of the mirror 55 is a spring-pressed ball 63 mounted in a holder 64 supported on the casing 30. At a remote point from the screws 57 and 58 and as shown in Fig. 8 and engaging an insert 65 in the outer edge of the mirror 55 is a ball 66 resting in a seated end of a plunger 67 which is mounted in and projects through a portion of the casing 30. By turning both screws 57 and 58 in the same direction the mirror 55 may be tilted within the casing 30, the screws 57 and 58 operating in one direction to move their engaged portions of the mirror away from the inclined wall 61 and against the action of the spring-pressed balls 63 and pivotally moving the mirror 55 on the ball 66. When the screws 57 and 58 are rotated in another direction the spring-pressed balls 63 cause their engaged portion of the mirror 55 to move nearer the inclined wall 61. Differential operations of the screws 57 and 58 will cause the mirror 55 to be turned on the pivot provided by the ball 66 and the insert 65. It will be apparent therefore, that since the mirror 55 may be tilted and rotated on its pivotal point of support the angular position of the mirror 55 relative to the cover glass 31 may be adjusted in two different ways. To maintain the mirror 55 pressed toward its pivotal point of support a spring-pressed rotatably supported pin 216 is mounted in the casing 30 to bear against a slotted edge 217 of the mirror 55 at a point directly opposite from the pivotal point of support of the mirror 55 provided by the ball 66.

Located within the space defined by the hood portion 27, as shown in Fig. 2, is the mirror 56 which is in position to receive an image of the target detected by the cover glass 31 and reflected by the mirror 55. The image is reflected by the mirror 55 to the mirror 56. The function of the mirror 56 is to reflect the image downwardly through the space defined by the flanged tubular member 20 and into the body 12 of the tracker. The mirror 56 is adjustably supported in a casing 68 which has a tubular base portion 69 mounted on an apertured wall 70 of the dome portion 28 by means of the screws 71. Spaced side walls 72 and 73 of the casing 68 extend upwardly from the tubular base portion 69 and terminate in a pan portion 74 in which the mirror 56 is supported at spaced points by means of screws 75 and 76 and a ball 77 and spring-pressed pins 78 in the same manner as the mirror 55 is supported in the casing 30.

Since the mirrors 55 and 56 are adjustably supported, they may be positioned to cooperatively direct an image of a target to a required point in the body 12 of the tracker.

Figure 4:
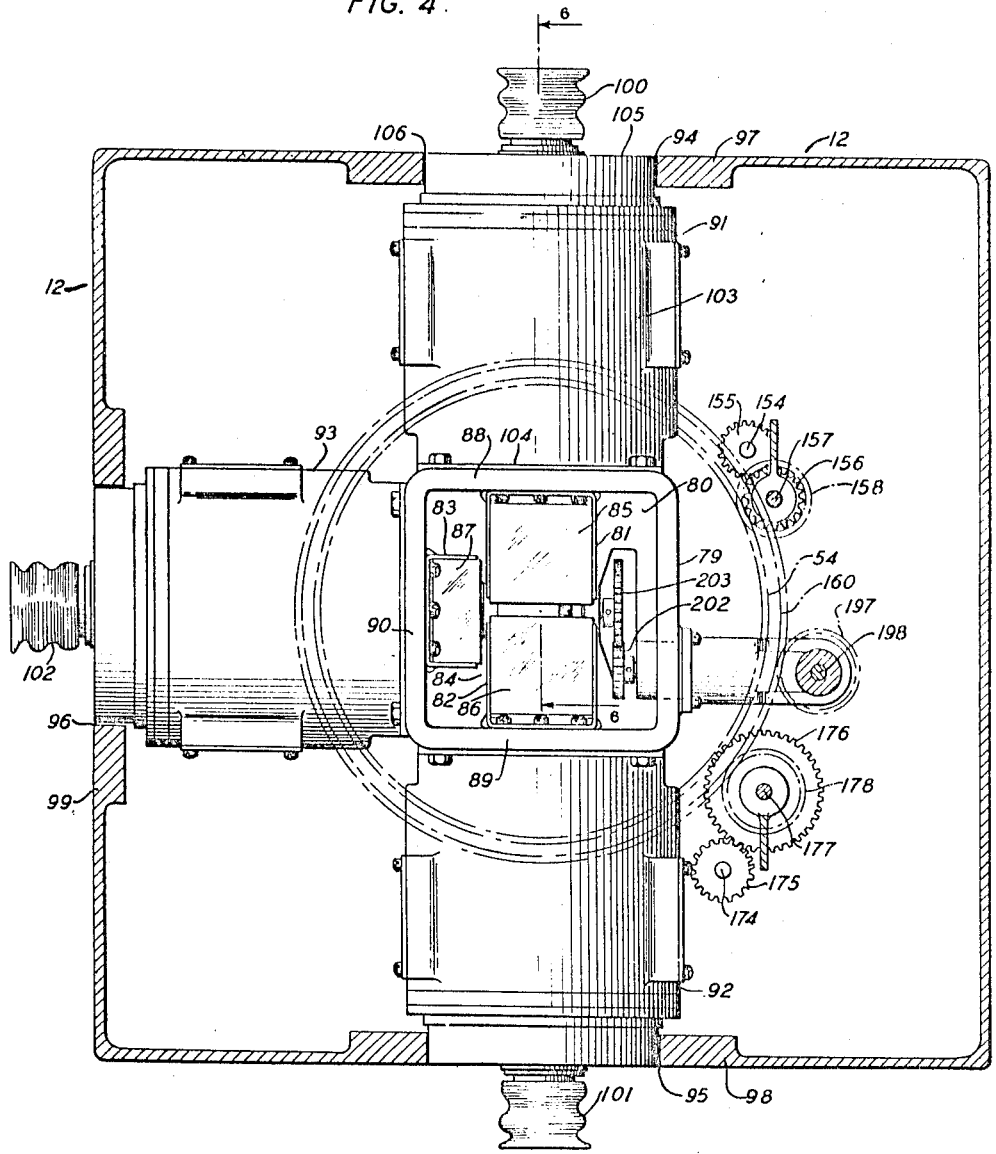
Fig. 4 is an enlarged view, partly in section, of the body of the optical sighting apparatus and parts contained in the body and looking downwardly in the body, this view being taken on the line 4—4 in Fig. 2.

As shown in Fig. 4, the body 12 contains a compartment 79, the walls of which cooperatively define a space 80 which is in register with the space defined by the flanged tubular member 20. Adjustably supported on brackets 81, 82 and 83 and located in the space 80 is a set 84 of prisms comprising the prisms 85, 86 and 87. Each prism is in register with an aperture provided in a wall of the compartment 79, the prism 85 being in register with an aperture provided in the wall 88, the prism 86 being in register with an aperture in the wall 89 and the prism 87 being in register with an aperture in the wall 90. The function of the set 84 of prisms is to receive light rays representing the image of the target picked up by the cover glass 31 and formed on the mirror 55 and reflected by the mirror 56 and direct the light rays representing the image into optical devices 91, 92 and 93 supported in the body 12 and exterior of the compartment 79 and in register with the respective apertures 94, 95 and 96 formed in the walls 97, 98 and 99 respectively of the body 12. The optical devices 91, 92 and 93 are equipped with the respective eyesight pieces 100, 101 and 102 which are used by operators and attendants of the tracker in observing a target, the eyesight pieces 100, 101 and 102 extending outwardly of the body 12. The optical device 91 receives light rays representing an image of the target from the prism 85 forms a virtual image of the target and directs the image to the eyesight piece 100. The optical device 92 receives light rays representing an image of the target from the prism 86 and forms a virtual image of the target and directs the image to the eyesight piece 101, and the optical device 93 receives light rays representing an image of the target from the prism 87 and forms a virtual image of the target and directs the image to the eyesight piece 102. The image of the target may therefore be observed simultaneously by three operators or attendants of the tracker.

Each optical device 91, 92 and 93 is constructed along the same general lines and an understanding of the construction of one will be sufficient for all. In Fig. 6 the construction of the optical device 91 is shown as comprising a tubular housing 103 having an apertured end wall 104 secured to the compartment 79 and so that the aperture in the end wall 104 is in register with one of the set 84 of prisms, in this case the prism 85 being the one serving the optical device 91. Directly in line with the prism 85 but located on the outer end of the housing 103 is an apertured flange 105 constructed to extend into an aperture 106 formed in the body 12 shown in Fig. 1. Mounted on the flange 105 and arranged to extend through the aperture 106 and outwardly from the body 12 is the eyesight piece 100 having lens members 107 and 108 contained therein, as shown in Fig. 10. Located in the housing 103 and disposed between the eyesight piece 100 and the prism 85 is a rotor 109 comprising apertured end portions 110 and 111 connected to a double inclined bridge portion 112 on which two mirrors 113 and 114 are adjustably supported by means of screw members 115 and 116 and spring-pressed members 117 providing in each case a three-point adjustable supporting system for the mirrors 113 and 114. The mirror 113 is downwardly inclined from a high point 118 on the bridge portion 112 and is directed toward a double lens system 119 supported in the apertured end portion 110 of the rotor 109 in register with the prism 85. From light rays representing an image of the target and coming through the prism 85 the double lens system 119 forms a virtual image of the target. The mirror 114 is downwardly inclined from the high point 118 and is directed toward the eyesight piece 100. A mirror 120 is located at a position offset from the mirrors 113 and 114 and is adjustably supported by means of screws 121 and spring-pressed members 122 mounted in a bracket 123 secured at 124 to the housing 103. The mirror 120 is positioned to receive an image from the mirror 113 and to reflect the image to the mirror 114 which in turn will reflect the image into the eyesight piece 100. The rotor 109 is supported in bearings 125 and 126, parts of which are mounted in the housing 103. A sector gear 127 is mounted on the rotor 109 to facilitate rotation of the rotor 109 in the housing 103.

The tracker may be operated to detect a target and follow the course of a moving target by two persons, one being stationed on one side of the tracker and operating the azimuth handwheel 128 shown in Figs. 1 and 10. The other operator is stationed on the side of the tracker opposite the position of the azimuth operator and operates the elevational handwheel 129 shown in Fig. 10. The tracker is provided with an azimuth dial 130 shown in Figs. 1 and 10 and an elevation dial 131 shown in Fig. 10 to show the relative settings of the elevation and azimuth mirrors, the body 12 being apertured at required points to accommodate certain shafts of the manual controls and to permit observance of the dials. The tracker is also provided with an orientation handwheel 132 shown in Fig. 10 to operate certain parts of the tracker to required relative initial positions, some of the parts being controlled through gear systems containing differential gear devices 133 and 134 shown in Fig. 10. The tracker is also provided with Selsyn devices 135 and 136 which are employed as transmitting Selsyns to control certain parts of gun director apparatus located at some point or points remote from the tracker.

When the tracker is placed in required position for operation the threaded rods 16 are adjusted in the Y fittings 15 to get the head 13 in a level position, a spirit level device 137 mounted on the head 13 as shown in Fig. 1 being observed during the adjustment of the threaded rods 16.

To detect a target the head 13 is rotated on a vertical axis indicated by the dot-dash line 218 and the casing 30 supported therein is rotated on a horizontal axis indicated by the dot-dash line 219 in Fig. 1 to scan an area being searched for the target. This may be done rather roughly at first and then more precisely later, as will be subsequently explained, or in a complete precision operation. In performing the precision operation one operator causes the head 13 to be rotated on the vertical axis 218 for azimuth positioning by manually turning the handwheel 128 which is known as the azimuth handwheel. This operator looks into the eyesight piece 100 to see an image of the target while the handwheel 128 is being operated. While this is being done a second operator causes the casing 30 in the head 13 to be rotated on the horizontal axis 219 for elevation positioning by manually turning the handwheel 129 which is known as the elevation handwheel. This second operator looks into the eyesight piece 101 to see an image of the target while the handwheel 129 is being operated. The head 13 and the casing 30 are rotated until the cover glass 31 is in register with the target. When the target is detected the operators of the handwheels 128 and 129 keep the cover glass 31 in line with the target by suitably operating the handwheels 128 and 129 and observing the images of the target visible by looking in the respective eyesight pieces 100 and 101. Another image of the target is visible also in the eyesight piece 102 and this image may be observed by an attendant of the tracker known as a spotter. The eyesight piece 102 is known as the spotter eyesight piece. Images of the target are, therefore, visible at three positions in the tracker, namely, the azimuth position, the elevation position and the spotter position. As shown in Fig. 10 and indicated by the dot-dash lines 138 and 139 in the figure light ray reflections from the target come through the cover glass 31 and are directed thereby to the mirror 55 which receives the light rays representing the image of the target and reflects the light rays representing the image to the mirror 56 which in turn reflects the light ray representing the image downwardly through the light passage provided by the flanged tubular member 20 and into the body 12 of the tracker in which the prisms 85, 86 and 87 are contained. Each prism 85, 86 and 87 receives the light rays representing an image of the target and each prism refracts and directs the light rays representing an image of the target to a separate optical device equipped with an eyesight piece. As shown in Fig. 10 the prism 85 directs the light rays representing an image of the target into the optical device 91, the prism 86 directs the light rays representing an image of the target into the optical device 92 and the prism 87, not shown in Fig. 10 but shown in Fig. 4, directs the light rays representing an image of the target into the optical device 93.

Since the head 13 is rotatable on a vertical axis and the casing 30 on a horizontal axis and the mirror 55 is turned for elevation and the mirrors 55 and 56 are turned in azimuth adjustment while reflecting the light rays representing the image to the prisms which are stationary, the light ray images directed by the prisms into the optical devices 91, 92 and 93 will appear to turn and produce an optical illusion that the target is turning. This illusion if carried to the eyesight pieces would give the operators incorrect impressions of the movement of the target. To correct the illusion and prevent it from being carried to the eyesight pieces 100, 101 and 102 the optical devices 91, 92 and 93 are provided with the rotors 109 and means are provided to simultaneously rotate the rotors 109 in required manner to make the virtual images received in the eyesight pieces appear in true position.

Mounted in the body 12 of the tracker are systems of gears and shafts providing mechanical drives between the handwheels 128, 129 and 132 and rotatable parts of the head 13 and between a rotatable part of the head 13 and the rotors 109 of the optical devices 91, 92 and 93. Mechanical drives are also provided to operate rotatable members in the Selsyns 135 and 136. The mechanical drives are shown schematically in Fig. 10 and will now be pointed out and explained in the order in which they operate.

In scanning an area to detect a target the head 13 of the tracker is rotated as a whole on a vertical axis for azimuth positioning of the cover glass 31 by operation of the azimuth handwheel 128. During this operation the casing 30 is often rotated on a horizontal axis for elevation positioning of the cover glass 31 by operation of the elevation handwheel 129.

The azimuth handwheel 128 is in driving connection with the gear 54 through a mechanical drive 140 comprising sets of rotatable shafts and gears extending from the azimuth handwheel 128 to the gear 54 which is mounted on the flanged tubular member 20. The differential gear device 133 is also included in the mechanical drive 140. The azimuth handwheel 128 is secured to a shaft 141 carrying a worm 142 engaging a wormwheel 143 mounted on a shaft 144. When the azimuth handwheel 128 is rotated the following parts of the mechanical drive 140 are rotated shaft 141, worm 142, wormwheel 143, shaft 144, bevel gear 145 mounted on shaft 144, bevel gear 146, shaft 147, gear 148, gear 149 and gear 150. If the orienting handweell 132 is held against rotation the driving action will be continued to the head 13 by rotation of the following shaft 151, bevel gear 152 carried on shaft 151, bevel gear 153, shaft 154, pinion 155 on shaft 154, pinion 156, shaft 157 and pinion 158 engaging gear 54. Rotation of gear 54 causes rotation of the head 13 on a vertical axis. Gear 149 is secured to a shaft 159 which drives a rotor element of the Selsyn 135. The Selsyn 135 may be used as a transmitting Selsyn to control another Selsyn, not shown, but located at some point remote from the tracker and operable to control certain parts of gun director apparatus remote from the tracker.

The elevation handwheel 129 is in driving connection with a gear 160 through a mechanical drive 161 comprising sets of rotatable shafts and gears extending from the elevation handwheel 129 to the gear 160. The differential gear device 134 is also included in the mechanical drive 161. The gear 160 is attached to and supports the bevel gear 53 which is in driving connection with the sector gear 51. The elevation handwheel 129 is secured to a shaft 162 carrying a worm 163 engaging a wormwheel 164 mounted on a shaft 165. When the elevation handwheel 129 is rotated the following parts of the mechanical drive 161 are rotated, shaft 162, worm 163, wormwheel 164, shaft 165, bevel gear 166 mounted on shaft 165, bevel gear 167, shaft 168, gear 169 and gear 170. If the differential device 134 is not free to idle, the driving action will be continued to the casing 30 in the head 13 by rotation of the following, shaft 171, bevel gear 172 carried on shaft 171, bevel gear 173, shaft 174, pinion 175 on shaft 174, pinion 176, shaft 177 and pinion 178 secured to shaft 177 and in driving engagement with gear 160. Supported on and secured to the gear 160 is the bevel gear 53 which is in driving engagement with the sector gear 51. When the sector gear 51 is driven the casing 30 is rotated on a horizontal axis to point the cover glass 31 to a higher or lower place in the area being scanned. Gear 170 is in driving connection with a gear 179 secured to shaft 180 which is connected to the rotor element of the Selsyn 136. The Selsyn 136 may be used as a transmitting Selsyn to control another Selsyn, not shown, but located at some point remote from the tracker and forming part of a gun director apparatus located remote from the tracker.

The differential gear devices 133 and 134 are epicyclic differential gear devices in which the two end bevel gears are free to rotate on the shaft and the side bevel gears are rotatably supported on arms extending from a central cross fitting 181 which is secured to the shaft. When one of the end bevel gears in the differential device is held or retarded against rotation the side bevel gears in the differential device walk around on the held or retarded end bevel gear and cause rotation of the shaft in the differential gear device.

A cross-connecting gear drive 182 is provided to control the differential gear device 134 from the gear drive 140 to nullify any driving effects rotation of the head 13 as a whole on a vertical axis might otherwise have on the casing 30 and such as might come by reason of the engagement of the sector gear 51 with the bevel gear 53. The cross-connecting gear drive 182 comprises a bevel gear 183 secured to the shaft 154, a bevel gear 184 in mesh with gear 183 and secured to a shaft 185, a pinion 186 secured to shaft 185 and engaging a pinion 187 secured to shaft 188 and a pinion 189 secured to shaft 188 and in mesh with a pinion 190 freely rotatable on the shaft 171 of the differential gear device 134. The pinion 190 is secured to the end bevel gear 191 of the differential gear device 134. When the head 13 is turned as a whole on the vertical axis and the sector gear 51 operates to tend to drive the gear 53 the cross-connecting gear drive 182 operates on the differential gear device 134 to make the differential gear device 134 counteract any driving effects of the sector gear 51 on the gear 53 and through the mechanical drive 161.

The orienting handwheel 132 may be held or locked while the azimuth handwheel 128 is turned. In this case the end gear 192 in the differential gear device 133 will be held and the side gears 193 and 194 will walk around on the end gear 192 and rotate the cross-fitting 195 which is secured to the shaft 151.

As above-mentioned, the optical devices 91, 92 and 93 are provided with rotors 109 and the rotors 109 are rotated at one-half the speed of rotation of the combined speeds of casing type body 26 and casing No. 30 in order that virtual images coming into the eyesight pieces 100, 101 and 102 will appear in true position. As shown in Fig. 10, a mechanical drive 196 is provided to drive the rotors 109 in the optical devices 91, 92 and 93. The optical device 93 is not shown in Fig. 10 since this optical device is disclosed at a 90-degree angle from the positions of the optical devices 91 and 92 shown in the figure. The mechanical drive 196 comprises a pinion 197 in mesh with the gear 160 and secured to a shaft 198, a bevel gear 199 secured to the shaft 198 and engaging a bevel gear 200 secured to a shaft 201, a pinion 202 secured to the shaft 201 and in mesh with a gear 203 secured to a shaft 204. Secured to one end of the shaft 204 is a gear 205 in mesh with the sector gear 127 on the rotor 109 of the optical device 91. Secured to the other end of the shaft 204 is a bevel gear 206 in mesh with a bevel gear 207, secured to a shaft 208. The bevel gear 207 is in mesh with a gear 209 secured to a shaft 210 on one end of which is secured a gear 211 in mesh with the sector gear 127 on the rotor 109 of the optical device 92. Secured also to the shaft 208 is a gear 212 to drive a shaft, not shown, but leading to and forming a driving means for the rotor 109 of the optical device 93. When the head 13 is being operated and the gear 160 is turning while the cover glass 31 is being pointed at a target, the mechanical drive 196 is operating to rotate the rotors 109 in the optical devices 91, 92 and 93. The mechanical drive 196 is designed to make the rotors 109 in the optical devices 91, 92 and 93 operate in required manner to make the virtual images of the target appearing in the eyesight pieces 100, 101 and 102 appear in correct position compared with the target, the rotors 109 being rotated in directions reverse from the directions of rotation of the images coming to the prisms 85, 86 and 87, the rotations of which are caused by rotations of the mirrors in the head 13 relative to the prisms 85, 86 and 87.

A bracket 213 is mounted on the casing 30 and extends outwardly thereof. The bracket 213 supports an infinity sight 214 through which an attendant of the tracker may sight a target and check with the operators of the tracker in pointing the cover glass 31 directly in line with the target. The optical devices 91, 92 and 93 are provided with means to show appropriate hair lines in the fields viewable in the eyesight pieces 100, 101 and 102 to compare with the images of the target, the optical device 91 showing a vertical hair line, the optical device 92 showing a horizontal hair line and the optical device 93 showing cross hair lines and a calibrated scale. The infinity sight 214 may have a lens system therein producing an optical effect of showing concentric colored rings extending around the center of the viewed field to enable the observer to roughly center a target in the field of view of the operators and attendants who are viewing the target through the eyesight pieces 100, 101 and 102.

The attendant of the infinity sight 214 can operate the head member 13 to scan an area and detect a target. In this case, the attendant of the infinity sight 214 grasps the bracket 213 and turns the head member 13 on a vertical axis and rotates the casing 30 on a horizontal axis by manually moving the bracket 213 in a suitable manner to point the infinity sight 214 to the area to be scanned and finally bring the infinity sight 214 in line with the target. The attendant of the infinity sight 214 may, therefore, slew the head member 13 in relatively quick movements to scan an area and detect a target and roughly bring the cover glass 31 in line with the target, the attendant of the infinity sight 214 observing the area being scanned by looking through the infinity sight 214 while he is operating the head member 13. When the attendant of the infinity sight 214 has brought the cover glass 31 in line with the target he can discontinue his operation of the head member 13 and let the operation of the azimuth and elevation handwheels take control. Clutch operating handles 215 are provided in the tracker to control clutches, not shown, but contained within the body 12 and located in the gear driving systems. The clutch operating handles 215 may be operated to release some parts of the gear driving systems from operation to permit relatively easy slewing of the head member 13.

The tracker embodying the present invention is readily transportable since it is relatively light in weight and small in size. The structure is also of considerable advantage since only the head portion need be exposed while all other portions may be set below ground level or otherwise protected from enemy observation or assault. The head might be made to extend a greater distance above the body than as shown in the figures to enable lower placement of the major portion of the tracker in an excavation or protective vault.

What is claimed is:

1. An optical sighting apparatus comprising a box-like body, apertured top and side walls in said body, a dome-like head rotatably supported on said body and rotatable on a vertical axis with respect to said body, an L-shaped casing supported in said head and rotatable on a horizontal axis with respect to said head, means for rotating said head on the vertical axis, and means for rotating said L-shaped casing on the horizontal axis, a light reflecting device in said L-shaped casing to receive light reflections from outside said L-shaped casing and to transmit the light reflections into said head, a light reflecting device in said head arranged to receive light reflections from the light reflecting device in said L-shaped casing, and to transmit the light reflections into said body, a set of light reflecting devices in said body to receive the reflections transmitted into said body by way of said head, each light reflecting device in said set being arranged to transmit light reflections in a direction different from the direction of transmission by other light reflecting devices in said set, and an optical eye-piece individual to each reflecting device in said set and supported in spaced relation in said body and extending through an apertured side wall in said body, said optical sighting apparatus providing a means whereby a plurality of persons operating the optical sighting apparatus may simultaneously see an image of a distant object on which the optical sighting apparatus is trained.

2. An optical sighting apparatus comprising a box-like body, apertured side walls in said body, a dome-like head supported on said body and rotatable on a vertical axis with respect to said body, an L-shaped casing supported in said head and rotatable on a horizontal axis with respect to said head, means to rotate said head on the vertical axis, means to rotate said L-shaped casing on the horizontal axis, a light reflecting device supported in said L-shaped casing to receive light reflections from a distant object and to reflect said light reflections into said head, a light reflecting device supported in said head to receive the light reflections and to transmit the light reflections into said body, a set of prisms supported in said body to receive the light reflections transmitted by said light reflecting devices, said set of prisms operating to transmit the light reflections in a plurality of different directions, and toward the apertured side walls of said body, and optical eye-pieces supported in the apertured side walls of said body and extending to the outside of said body and arranged to receive light reflections from said set of prisms, said optical sighting apparatus providing a means whereby a plurality of persons operating the optical sighting apparatus and looking into said optical eye-pieces may see an image of a distant object when the optical sighting apparatus is trained on the distant object and light ray reflections are coming into said head from the distant object.

3. An optical sighting apparatus through which a distant object may be sighted and observed comprising a box-like body, apertured top and side walls in said body, a dome-like head rotatable on a vertical axis with respect to said body and supported on top of said body, an elbow-type casing rotatable on a horizontal axis with respect to said head and supported in said head, a portion of said elbow-type casing extending from said head, a light receiving and reflecting device supported in said elbow-type casing to receive light rays, and to reflect the light rays into said head, a light receiving and reflecting device supported in said head to transmit the light rays into said body, a set of spaced and angularly disposed light reflecting devices in said body, each of the light reflecting devices in said set operating to reflect the light rays toward a separate opening in a side wall of said body, an optical eye-piece for each light reflecting device in said set and mounted in an apertured side wall of said body and in register with said set of light reflecting devices, a rotor in each optical eye-piece, reflectors on said rotor and a stationary reflector in spaced relation with said reflectors, means to rotate said head on its vertical axis, means to rotate said elbow-type casing on its horizontal axis and means to automatically rotate the rotors in the optical eye-pieces when said dome-like head is operated.

4. An optical sighting apparatus through which a distant object may be sighted and observed comprising in combination, a box-like body, apertured top and side walls in said body, a dome-like head rotatable on a vertical axis with respect to said body and supported on top of said body, an elbow-like casing rotatable on a horizontal axis with respect to said head and supported in and extending from said head, means in said elbow-type casing to receive light rays reflected from the distant object and to reflect the light rays into said head, means in said head to reflect the light rays into said body, optical eye-pieces mounted in apertured side walls in said body and extending to the outside of said body, means mounted in said body to reflect the light rays into said optical eye-pieces, means to rotate said head on its vertical axis, means to rotate said elbow-like casing on its horizontal axis, a bellows forming a light ray excluding wall between a portion of said body and a portion of said head, and a bellows forming a light ray excluding wall between a portion of said head and a portion of said casing.

ELSWORTH H. GOLDSMITH.
ROY V. TERRY.
JACOB W. SCHAEFER.

REFERENCES CITED

The following references are of record in the file of this patent:

UNITED STATES PATENTS

| Number | Name | Date |
|---|---|---|
| 784,852 | Goerz | Mar. 14, 1905 |
| 873,228 | Hahn | Dec. 10, 1907 |
| 1,186,707 | Thorne | June 13, 1916 |
| 1,479,036 | Fosdick | Jan. 1, 1924 |
| 1,559,716 | Lingle et al. | Nov. 3, 1925 |
| 1,744,994 | Van Hofe et al. | Jan. 28, 1930 |
| 2,039,878 | Boykow | May 5, 1936 |
| 2,152,726 | Baroni | Apr. 4, 1939 |
| 2,184,615 | Gunther | Dec. 26, 1939 |
| 2,372,192 | Fassel | Mar. 27, 1945 |
| 2,378,937 | Leeds | July 26, 1945 |